(12) United States Patent
Studenberg, Jr. et al.

(10) Patent No.: US 7,761,069 B1
(45) Date of Patent: Jul. 20, 2010

(54) SYSTEM AND METHOD FOR PROVIDING REDUCED ANTENNA RADIO COMMUNICATIONS WITH HIGH FAULT TOLERANCE

(75) Inventors: Fred J. Studenberg, Jr., Melbourne, FL (US); Bradley P. Baker, Harbour Beach, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 574 days.

(21) Appl. No.: 11/786,179

(22) Filed: Apr. 11, 2007

(51) Int. Cl.
*H04B 17/02* (2006.01)
(52) U.S. Cl. ............... 455/132; 455/78; 455/143; 455/230; 455/242.1
(58) Field of Classification Search ............ 455/132, 455/78, 143, 230, 242.1, 83, 88, 91, 103–104, 455/107, 120–121, 130, 133, 137, 168.1, 455/191.3, 242.2, 90.3, 550.1, 575.1
See application file for complete search history.

(56) References Cited

U.S. PATENT DOCUMENTS 6,996,389 B2 *   2/2006  Fitzpatrick et al. ....... 455/343.1
7,224,170 B2 *   5/2007  Graham et al. ............ 324/522
2009/0081963 A1 *   3/2009  Boren ..................... 455/90.1

* cited by examiner

*Primary Examiner*—Pablo N Tran
(74) *Attorney, Agent, or Firm*—Matthew J. Evans; Daniel M. Barbieri

(57) ABSTRACT

The present invention is a radio communications system. The system includes a first Line-Replaceable Unit (LRU) and a second Line-Replaceable Unit (LRU). Each LRU includes two transmitters, a multi-channel receiver, a passive hybrid combiner-splitter, and a bypass relay. The first LRU and the second LRU are communicatively coupled via a crosslink connection, such as a coax cable connection. The system includes first and second antennas, which are communicatively coupled with the first and second LRUs respectively. The system includes a crosslink bus configured for communicatively coupling the first and second LRUs, thereby allowing the LRUs to coordinate operation of the relays via the crosslink bus. Still further, the system is configured for providing concurrent transmit and receive operation.

11 Claims, 4 Drawing Sheets

SYSTEM AND METHOD FOR PROVIDING REDUCED ANTENNA RADIO COMMUNICATIONS WITH HIGH FAULT TOLERANCE

FIELD OF THE INVENTION

The present invention relates to the field of, integrated communications for navigation systems and particularly to a system and method for providing reduced antenna radio communications with high fault tolerance.

BACKGROUND OF THE INVENTION

Radio communications systems, such as Very High Frequency Communication (VHF COM) Systems, are often used in aircraft, such as General Aviation (GA) and Air Transport (AT) aircraft. A number of currently implemented VHF COM systems utilize three Line-Replaceable Units (LRUs) and three antennas, with each LRU being connected to its own dedicated antenna. These current systems (ex—3 antenna, 3 LRU, VHF COM systems) provide dedicated, independent voice communications for pilot and co-pilot as well as having one of the LRUs dedicated for data link operation. With such systems, simultaneous transmit and receive operation with any combination of the LRUs is desirable, so as not to restrict operation of any of the LRUs.

The above-referenced current systems (ex—3 antenna, 3 LRU, VHF COM systems) are typically configured so that two of the antennas are located on a top and bottom surface of an aircraft respectively (i.e., the "opposite side" antenna pair), while the third antenna shares either the top or bottom surface with one of the other two antennas (i.e., the "same side" antenna pair). The path loss isolation for the "opposite side" antenna pair may be 50+ dB, depending upon the size of an airframe of the aircraft. Given the power levels, transmitter noise floor, and receiver designs available in existing radio communication system products, very good simultaneous transmit and receive operation is possible for the "opposite side" antenna pair. In contrast, the antennas of the "same side" antenna pair, although typically spaced as far apart horizontally with respect to one another as is practical, may have a path loss isolation of 20 to 35 dB. Consequently, when using the "same side" antenna pair of current systems, only marginally acceptable simultaneous transmit and receive operation may be attainable, depending upon frequency separation and actual isolation between the antennas. A further problem with the existing systems (ex—3 antenna, 3 LRU, VHF COM systems) is that when configured on an aircraft, they tend to be cumbersome, resulting in unwanted weight and drag forces on the aircraft. Still further, a number of current systems may require utilization of complicated adaptive cancellation techniques in order to provide good simultaneous transmit and receive operation under various conditions (ex—normal or failed modes).

Thus, it would be desirable to have a system and method for providing radio communications which addresses the problems associated with current solutions.

SUMMARY OF THE INVENTION

Accordingly an embodiment of the present invention is directed to a radio communications system, including: a first Line-Replaceable Unit (LRU) and a second Line-Replaceable Unit (LRU), the first LRU including a first transmitter, a second transmitter, a first multi-channel receiver, a first passive hybrid combiner-splitter, and a first bypass relay, the second LRU including a third transmitter, a fourth transmitter, a second multi-channel receiver, a second passive hybrid combiner-splitter, and a second bypass relay, the first LRU and the second LRU being communicatively coupled via a crosslink connection; a first antenna and a second antenna, the first antenna being communicatively coupled with the first LRU, the second antenna being communicatively coupled with the second LRU; and a crosslink bus configured for communicatively coupling the first LRU and the second LRU, the first LRU and the second LRU being configured for coordinating operation of the first bypass relay and the second bypass relay via the crosslink bus, wherein the system is configured for providing concurrent transmit and receive operation.

A further embodiment of the present invention is directed to a method for providing reduced antenna radio communications, including: when a first receiver of a first LRU is operable, activating a first transmitter of a second LRU; when the first receiver of the first LRU is operable, connecting the first transmitter of the second LRU via a first passive hybrid combiner-splitter of the second LRU to a first antenna, the first antenna being communicatively coupled to the second LRU; when the first receiver of the first LRU is operable, transmitting a first signal from the first transmitter of the second LRU to the first antenna, the first antenna being communicatively coupled to the second LRU; when the first receiver of the first LRU is operable, receiving a second signal at the first receiver of the first LRU, the second signal being transmitted from a second antenna, the second antenna being communicatively coupled to the first LRU via a second passive hybrid combiner-splitter of the first LRU; and when at least one of the first receiver of the first LRU and electronics of the first LRU is disabled, re-routing the second signal transmitted from the second antenna via the second passive hybrid combiner-splitter, then to a first bypass relay of the first LRU, then to a second bypass relay of the second LRU via a crosslink connection which communicatively connects the first LRU with the second LRU, then to a second receiver of the second LRU, wherein reception of the second signal by at least one of the first receiver and the second receiver occurs concurrently with the transmission of the first signal from the first transmitter.

An additional embodiment of the present invention is directed to a method for providing reduced antenna radio communications, including: activating a first transmitter of a first LRU, a second transmitter of a first LRU, and a third transmitter of a second LRU; connecting the first transmitter and the second transmitter via a first passive hybrid combiner-splitter of the first LRU to a first antenna, the first antenna being communicatively coupled to the first LRU; connecting the third transmitter via a second passive hybrid combiner-splitter of the second LRU to a second antenna, the second antenna being communicatively coupled to the second LRU; transmitting a first signal from the first transmitter to the first antenna and a second signal from the second transmitter to the first antenna; and transmitting a third signal from the third transmitter to the second antenna, wherein the first signal, the second signal and the third signal are transmitted concurrently.

An still further embodiment of the present invention is directed to a method for providing reduced antenna radio communications, including: when a first receiver of a first LRU is operable, activating a first transmitter of a second LRU; when the first receiver of the first LRU is operable, connecting the first transmitter of the second LRU via a first passive hybrid combiner-splitter of the second LRU to a first antenna, the first antenna being communicatively coupled to the second LRU; when the first receiver of the first LRU is operable, transmitting a first signal from the first transmitter of the second LRU to the first antenna, the first antenna being communicatively coupled to the second LRU; when the first receiver of the first LRU is operable, receiving a second signal at the first receiver of the first LRU, the second signal being transmitted from a second antenna, the second antenna being communicatively coupled to the first LRU via a second passive hybrid combiner-splitter of the second LRU; and when the second antenna is disabled, connecting one of the first receiver of the first LRU and a second receiver of the second LRU to an output of the first passive hybrid combiner-splitter of the second LRU, wherein reception of the second signal occurs concurrently with the transmission of the first signal.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
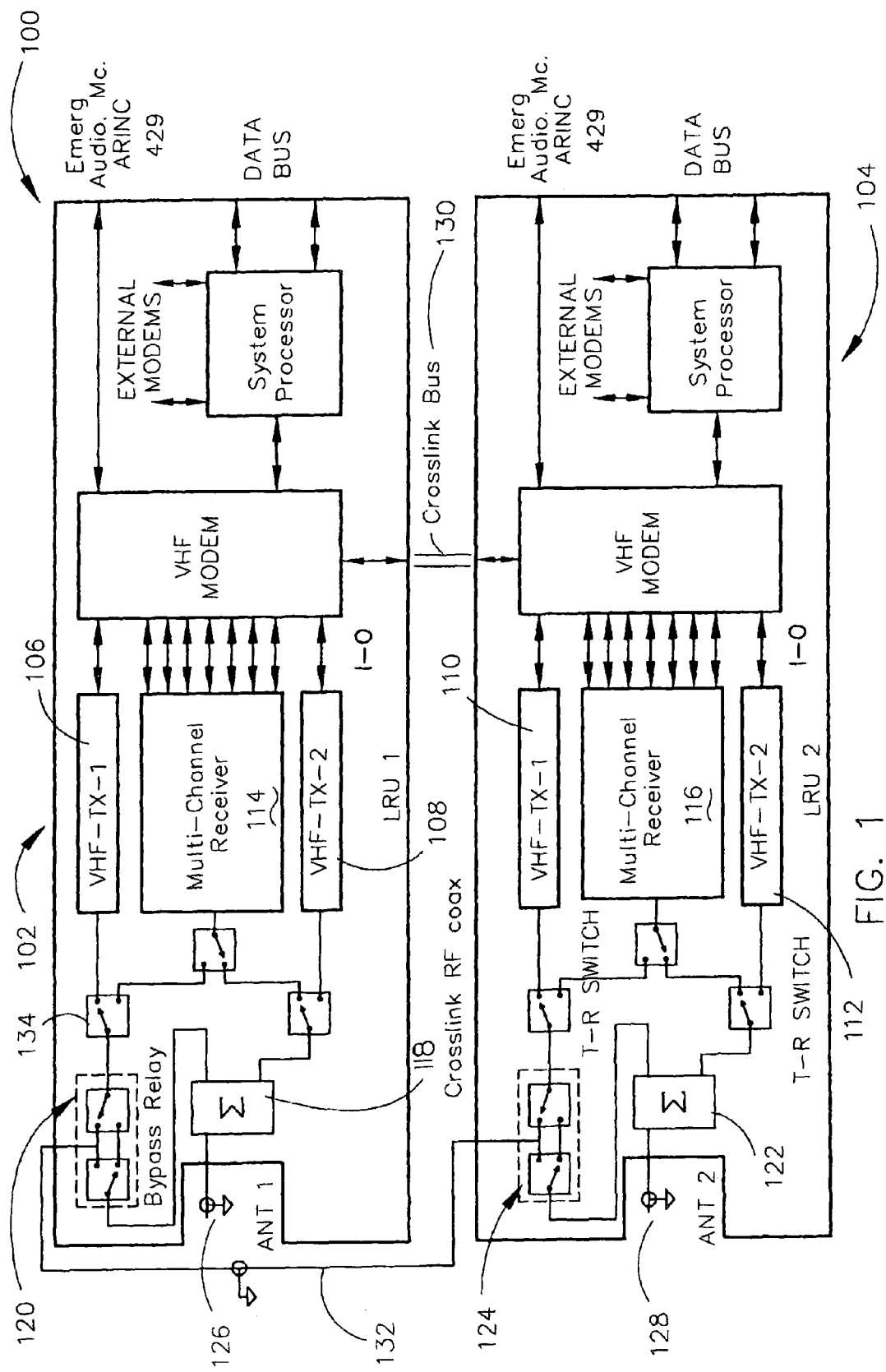
FIG. 1 is a block diagram schematic of a radio communications system in accordance with an exemplary embodiment of the present invention.

FIG. 1 is a block diagram schematic of a radio communications system in accordance with an exemplary embodiment of the present invention. In a current embodiment, the radio communications system 100 may be a Very High Frequency Communications (VHF COM) system (ex—a Radio Cabinet Communications System (RCCS)) which allows for audio and data communications and may be implemented aboard an aircraft, such as a Ballistic Recovery System (BRS) or Air Traffic (AT) aircraft. In a present embodiment, the radio communications system 100 includes a first Line-replaceable Unit (LRU) 102 and a second Line-replaceable Unit (LRU) 104. For instance, each LRU (102, 104) may be a "black box" of electronics, such as a radio or other auxiliary equipment for a complex engineered system, such as an aircraft. Further, each LRU (102, 104) may be designed according to Aeronautical Radio Incorporated (ARINC) specifications for use in commercial aircraft. Alternatively, the LRUs (102, 104) may be designed/defined by manufacturers such as Airbus and Boeing. Still further, each LRU (102, 104) may be defined by various military organizations, and may, for example, be designed to interface according to data bus standards such as MIL-STD-1553.

In an exemplary embodiment, each LRU (102, 104) includes dual transmitters, with the first LRU 102 including a first transmitter 106 and a second transmitter 108, and the second LRU 104 including a third transmitter 110 and a fourth transmitter 112. Further, the first LRU 102 includes a first multi-channel receiver 114 and the second LRU 104 includes a second multi-channel receiver 116. In a present embodiment, each multi-channel receiver (114, 116) may be configured for simultaneously demodulating each of three independent channels in any operating mode (exs.—Amplitude Modulation (AM), voice, data). Further, each multi-channel receiver (114, 116) may be tuned to the same three channels regardless of its location (ex—regardless of which LRU (102, 104) it is included with).

In additional embodiments, the first LRU 102 includes a first passive hybrid combiner-splitter 118 and a first bypass relay 120. The second LRU 104 includes a second passive hybrid combiner-splitter 122 and a second bypass relay 124. Further, the first LRU 102 is communicatively coupled to a first antenna 126 (ex—dedicated, standard VHF COM antenna) via the first passive hybrid combiner-splitter 118, while the second LRU 104 is communicatively coupled to a second antenna 128 via the second passive hybrid combiner-splitter 122. For instance, the antennas (126, 128) may be standard VHF COM antennas connected in a dedicated manner to their respective LRUs (102, 104). Further, the antennas (126, 128) may be configured for being located on opposite surfaces (ex—top and bottom surfaces) of an aircraft, thereby allowing for desirable path loss isolation for the antennas (ex—50+ dB, depending upon airframe size, type) and further allowing for high quality simultaneous transmit and receive operation for the system 100. During normal operations, one LRU (102, 104) may be used for all transmit operations, while the other LRU is used for reception. The high degree of antenna isolation of the 2-antenna system 100 of the present invention allows for simultaneous reception of any number of channels in the presence of up to two simultaneous transmissions.

In exemplary embodiments, the combiner-splitters (118 and 122) allow the 2-antenna system 100 of the present invention to provide multiple channel transmitter functionality and simultaneous transmit-receive operation. The combiner-splitters (118 and 122) of the present invention may be implemented in various circuit topologies (exs.—quadrature hybrid, magic T, or the like). During receive operations, each combiner-splitter (118, 122) may be configured for "splitting" a signal received from an antenna (126, 128) for reception via two separate ports (i.e., "split ports"), with high isolation between the "split ports" and relatively constant impedance at each of the "split ports". During transmit operations, each combiner-splitter (118, 122) may be configured for applying two independent transmit signals to a single antenna (126 or 128). In further embodiments, each combiner-splitter may also be configured to apply a transmitter (106, 108, 110, 112) to a single antenna (126 or 128), while simultaneously connecting a receiver to that antenna in a manner which allows for reasonable isolation between the applied transmitter and the connected receiver.

As discussed above, in order to emulate existing 3-channel LRU systems, each multi-channel receiver (114, 116) of the present invention may be configured to simultaneously demodulate each of three independent channels in any operating mode. In an exemplary embodiment, the system 100 includes a crosslink bus 130 which may be configured for being connected between the first LRU 102 and the second LRU 104 and may further be configured for communicatively coupling the LRUs 102 and 104. In additional embodiments, the crosslink bus 130 may be a digital crosslink bus configured for transmitting demodulated digital baseband audio and/or data (ex—demodulated signals from the receivers 114, 116) between the LRUs (102, 104) via the crosslink bus 130. For example, because each multi-channel receiver (114, 116) may be tuned to the same three channels (as previously discussed), each LRU (102, 104) may be configured (ex—may contain circuitry) for instantaneously selecting which of the receivers (114 or 116) has the best demodulated signal. In present embodiments, one of the LRUs (102, 104) may be configured for being designated as the "master" LRU for a particular function (ex—COM 1, 2, or 3) and may provide the voting function (i.e., make the final/deciding determination) as to which receiver's (114, 116) demodulated signal is best. Once selected, the best demodulated signal may be transmitted between LRUs (102, 104) via the crosslink bus 130.

In further embodiments, the crosslink bus 130 may be configured for carrying/propagating transmit data (ex—digitized microphone audio or digital data) and may further be configured to allow either LRU (102, 104) to use either of its respective transmitters (106, 108, 110, 112) to transmit on a given frequency. Further, this receiver and transmitter redundancy provided via the crosslink bus 130 may allow for a high degree of reconfiguration of the system 100 should a partial or total failure of component(s) (ex—receivers, transmitters, etc.) of the LRUs (102, 104) occur.

In additional embodiments, the system 100 includes a crosslink connection 132, such as a coax cable connection. The crosslink connection 132 is configured for communicatively coupling the first LRU 102 and the second LRU 104. For instance, the crosslink connection 132 may be a coax cable configured for being connected on opposite ends to the combiner-splitters (118, 122) of each LRU (102, 104). The crosslink connection 132 allows for/promotes ease of reconfiguration of the system 100 for allowing the system 100 to provide continuing operation under various system failure conditions.

In present embodiments, each LRU (102, 104) may include a plurality of Transmit/Receive switches 134 for allowing a transmitter (106, 108, 110, 112) and/or a receiver (114, 116) to be connected to an antenna (126, 128). As previously mentioned above, each LRU (102, 104) includes a bypass relay (120, 124). The bypass relays (120, 124) may be communicatively coupled via the crosslink connection 132. Each bypass relay (120, 124) may be configured for re-routing signals between the LRUs (102, 104) via the crosslink connection 132. For instance, a signal may be received at the first antenna 126 and may be intended for the first receiver 114 of the first LRU 102, however, the bypass relays (120, 124) may be configured for re-routing the signal to the second receiver 116 of the second LRU 104 in event the first receiver 114 has failed. In exemplary embodiments, operation of the bypass relays (120, 124) may be coordinated by the LRUs (102, 104) via the crosslink bus 130. For example, under normal conditions (ex—non-failure mode), the bypass relays (120, 124) may always be left in a position where each LRU (102, 104) is operated into its dedicated antenna (126 and 128 respectively) and the crosslink connection 132 is not needed. Alternatively, when one of the LRU's (102, 104) has failed or is not functioning, the functioning LRU may control the operation of the bypass relays (120, 124). For example, the bypass relays (120, 124) may be activated by a discrete voltage sent by a control line of the active/functioning LRU. For instance, when installed into a system rack, a crosslink relay (includes bypass relays 120, 124 and crosslink path 132) may be controlled by the active/functioning LRU.

In exemplary embodiments, although each hybrid combiner-splitter (118, 122) may experience a 3 dB loss, the 2-antenna system 100 of the present invention may, in most cases, implement short, low-loss coax runs for providing its crosslink connection 132, thereby allowing the system's total link margin to be nearly identical to that of existing 3-antenna systems. Further, the system 100 of the present invention may provide a 3 dB improvement in signal-plus-noise-plus-distortion to noise-plus-distortion ratio (SINAD) during reception of AM signals. Because both multi-channel receivers (114, 116) of the LRUs (102, 104) may be active on any given channel and may be receiving on separate antennas (126, 128), audio outputs are coherent and may be summed such that a 6 dB improvement in audio level results with only a 3 dB increase in non-correlated noise, thereby providing a net 3 dB improvement in SINAD and promoting improved receiver link margin in AM voice operation. Although no corresponding improvement in data modes is provided (since addition of signals is not accomplished at the radio frequency (RF) or intermediate frequency (IF) level), each receiver (114, 116) of the system 100 may be demodulating the same message and should one of the receivers not demodulate due to higher bit error ratio (BER) from antenna angles or shadowing, the crosslink bus 130 may allow the "master" receiver for that particular channel to utilize an offside data packet (ex—data packet from the LRU opposite the LRU containing the "master" receiver).

In exemplary embodiments, the 2-antenna system 100 of the present invention provides a system having a reduced number of LRUs and corresponding VHF COM antennas compared to the existing 3-antenna systems, which may thereby promote reduced weight and drag when the system 100 is implemented on an aircraft. Further, the system 100 of the present invention may be configured as a software-defined radio (SDR) system (i.e., may be implemented using a software defined radio (SDR) approach), thereby further promoting reduction in size, weight, power consumption and total cost (SWAP C) of the system 100 as compared to existing 3-antenna, 3-LRU systems.

Figure 2:
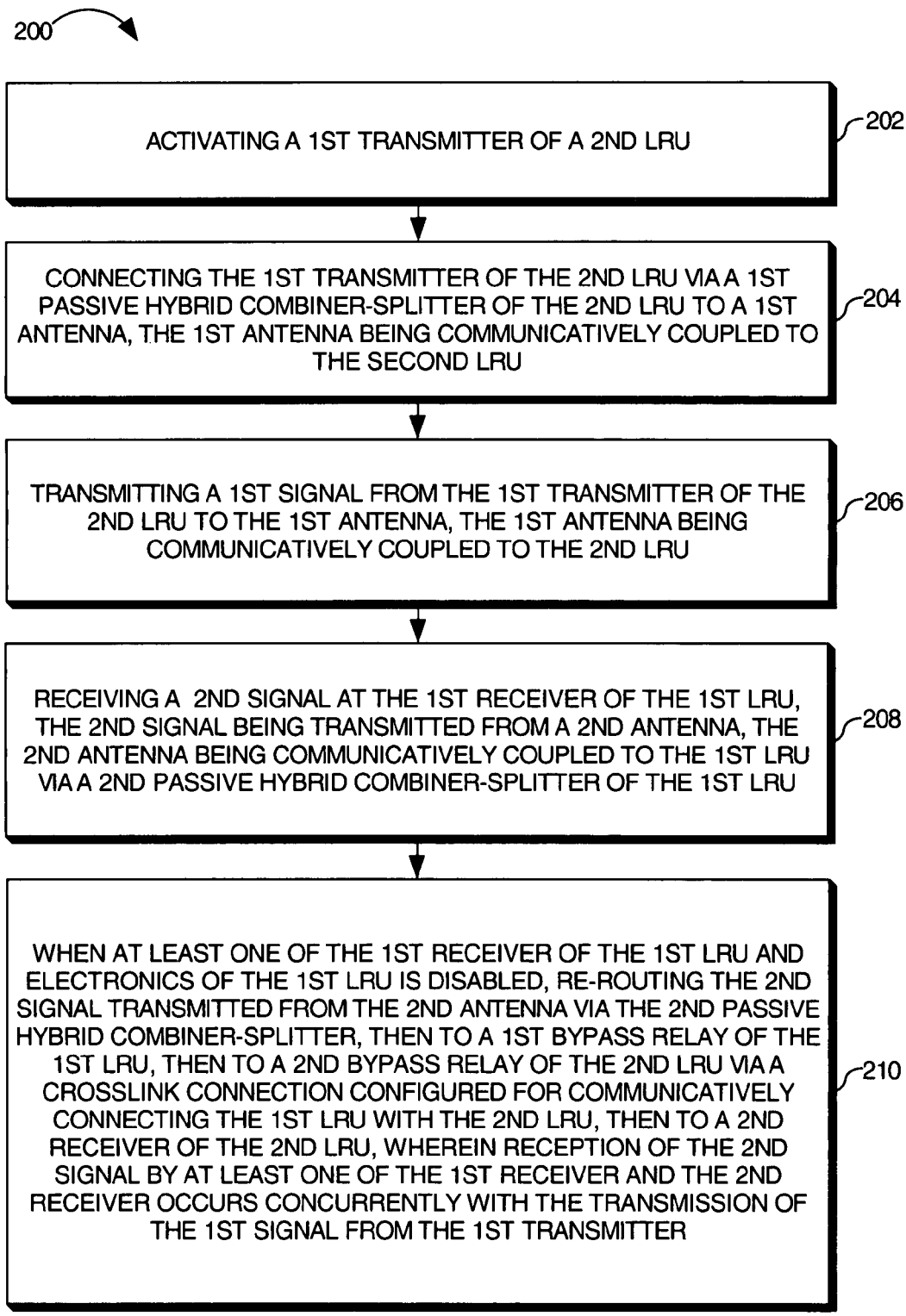
FIG. 2 is a flowchart illustrating a method for providing reduced antenna radio communications in accordance with an exemplary embodiment of the present invention.

FIG. 2 illustrates a method for providing reduced antenna radio communications via the system 100 of the present invention in accordance with an exemplary embodiment of the present invention. The method 200 may include, when a first receiver (116) of a first LRU (104) is operable, activating a first transmitter (106) of a second LRU (102), 202. The method 200 may further include, when the first receiver (116) of the first LRU (104) is operable, connecting the first transmitter (106) of the second LRU (102) via a first passive hybrid combiner-splitter (118) of the second LRU (102) to a first antenna (126), the first antenna (126) being communicatively coupled to the second LRU (102) 204. For example, the steps of activation 202 and connection 204 may be performed via a Transmit-Receive switch 134 of the system 100. The method 200 may further include, when the first receiver (116) of the first LRU (104) is operable, transmitting a first signal from the first transmitter (106) of the second LRU (102) to the first antenna (126), the first antenna (126) being communicatively coupled to the second LRU (102), 206.

The method 200 may further include, when the first receiver (116) of the first LRU (104) is operable, receiving a second signal at the first receiver (116) of the first LRU (104), the second signal being transmitted from a second antenna (128), the second antenna (128) being communicatively coupled to the first LRU (104) via a second passive hybrid combiner-splitter (122) of the first LRU (104), 208. For instance, during transmission of the first signal to the first antenna (126), the receiver (116) may be able to continue receiving other channels via the second antenna (128). The 2-antenna system 100 of the present invention, because of its high antenna isolation between its two antennas (126) and (128), (ex—they can be top and bottom antennas mounted on top and bottom surfaces respectively of an aircraft) may provide unimpeded, simultaneous transmit and receive operation which is at least equal in quality to existing top and bottom mounted LRUs/Antennas of existing systems.

The method 200 may further include when at least one of the first receiver (116) of the first LRU (104) and electronics of the first LRU (104) is disabled, re-routing the second signal transmitted from the second antenna (128) via the second passive hybrid combiner-splitter (122), then to a first bypass relay (124) of the first LRU (104), then to a second bypass relay (120) of the second LRU (102) via a crosslink connection (132) which communicatively connects the first LRU (104) with the second LRU (102), then to a second receiver (114) of the second LRU (102), 210. In an exemplary embodiment, reception of the second signal by at least one of the first receiver (116) and the second receiver (114) may occur concurrently with the transmission of the first signal from the first transmitter (106). In this manner, the system 100 of the present invention may allow for concurrent (ex—simultaneous) transmission and reception to occur when at least one of an LRU electronics failure and a receiver failure occurs. In present embodiments, the crosslink connection (132) may be a coax cable connection.

In current embodiments, the method 200 may further include, when the first receiver (116) of the first LRU (104) is operable, activating a second transmitter (108) of the second LRU (102), 212. The method 200 may further include, when the first receiver (116) of the first LRU (104) is operable, connecting the second transmitter (108) of the second LRU (102) via the first passive hybrid combiner-splitter (118) of the second LRU (102) to the first antenna (126), the first antenna (126) being communicatively coupled to the second LRU (102), 214. The method 200 may further include, when the first receiver (116) of the first LRU (104) is operable, transmitting a third signal from the second transmitter (108) of the second LRU (102) to the first antenna (126), the first antenna (126) being communicatively coupled to the second LRU (102), 216. In this manner, the system 100 of the present invention allows for two simultaneous transmissions to be sent to the first antenna (126) via the first passive hybrid combiner-splitter (118) from the transmitters (106, 108) of the second LRU (102), while further allowing for simultaneous reception of a $3^{rd}$ channel from the second antenna (128) via the second passive hybrid combiner-splitter (122) by the receiver (116) of the first LRU (104) with minimal co-site interference. In this manner, because of its antenna isolation, the 2-antenna system 100 of the present invention may provide superior performance over existing 3-antenna, 3 LRU systems in which 2 LRUs of the existing systems are simultaneously transmitting. For instance, with existing 3-antenna, 3 LRU systems, when top and bottom (i.e., first and second) antennas are being used for transmission and the third antenna is being used for reception, the relatively low antenna isolation between one of the transmitting antennas and the receiving antenna may degrade reception. Contrastingly, the 2-antenna system 100 of the present invention may allow for two simultaneous transmissions, along with a reception of a third channel without the degraded reception which occurs in the existing 3-antenna systems.

In exemplary embodiments, the method 200 may further include, when the first receiver (116) of the first LRU (104) is disabled, activating a third transmitter (110) of the first LRU (104), 218. The method 200 may further include, when the first receiver (116) of the first LRU (104) is disabled, connecting the third transmitter (110) of the first LRU (104) via the second passive hybrid combiner-splitter (122) of the first LRU (104) to the second antenna (128), the second antenna (128) being communicatively coupled to the first LRU (104), 220. The method 200 may further include, when the first receiver (116) of the first LRU (104) is disabled, transmitting the first signal from the third transmitter (110) of the first LRU (104) to the second antenna (128), the second antenna (128) being communicatively coupled to the first LRU (104), 222. The method 200 may further include, when the first receiver (116) of the first LRU (104) is disabled, activating a fourth transmitter (112) of the first LRU (104), 224. The method 200 may further include, when the first receiver (116) of the first LRU (104) is disabled, connecting the fourth transmitter (112) of the first LRU (104) via the second passive hybrid combiner-splitter (122) of the first LRU (104) to the second antenna (128), the second antenna (128) being communicatively coupled to the first LRU (104), 226. The method 200 may further include, when the first receiver (116) of the first LRU (104) is disabled, transmitting the third signal from the fourth transmitter (112) of the first LRU (104) to the second antenna (128), the second antenna (128) being communicatively coupled to the first LRU (104), 228.

Figure 3:
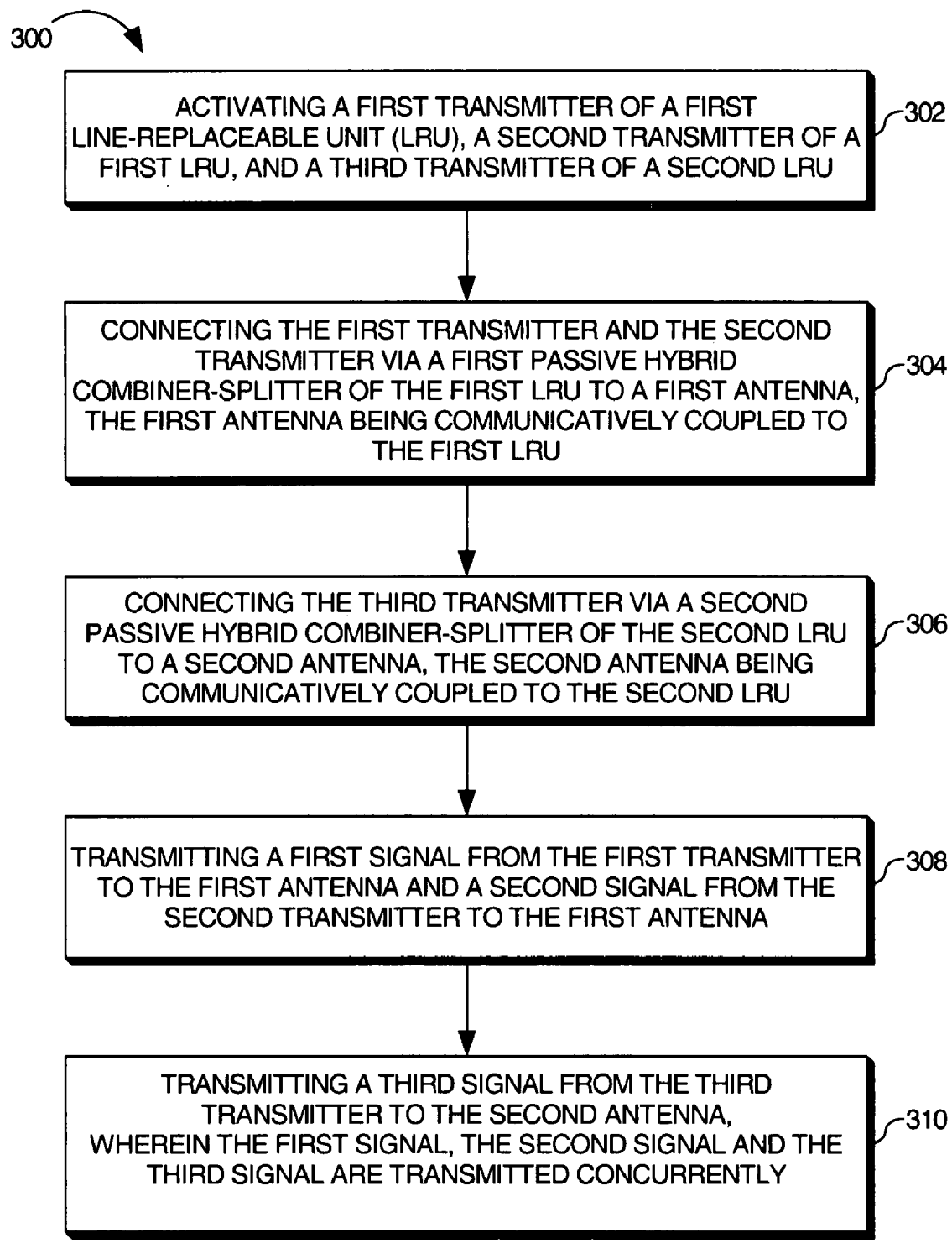
FIG. 3 is a flowchart illustrating a method for providing reduced antenna radio communications in accordance with an exemplary embodiment of the present invention.

FIG. 3 illustrates a method for providing reduced antenna radio communications via the system 100 of the present invention in accordance with an exemplary embodiment of the present invention. The method 300 may include activating a first transmitter (110) of a first LRU (104), a second transmitter (112) of a first LRU (104), and a third transmitter (108) of a second LRU (102), 302. The method 300 may further include connecting the first transmitter (110) and the second transmitter (112) via a first passive hybrid combiner-splitter (122) of the first LRU (104) to a first antenna (128), the first antenna (128) being communicatively coupled to the first LRU (104), 304. The method 300 may further include connecting the third transmitter (108) via a second passive hybrid combiner-splitter (118) of the second LRU (102) to a second antenna (126), the second antenna (126) being communicatively coupled to the second LRU (102), 306. The method 300 may further include transmitting a first signal from the first transmitter (110) to the first antenna (128) and a second signal from the second transmitter (112) to the first antenna (128), 308. The method 300 may further include transmitting a third signal from the third transmitter (108) to the second antenna (126), 310. In current embodiments, the first signal, the second signal and the third signal are transmitted concurrently (ex—simultaneously).

Figure 4:
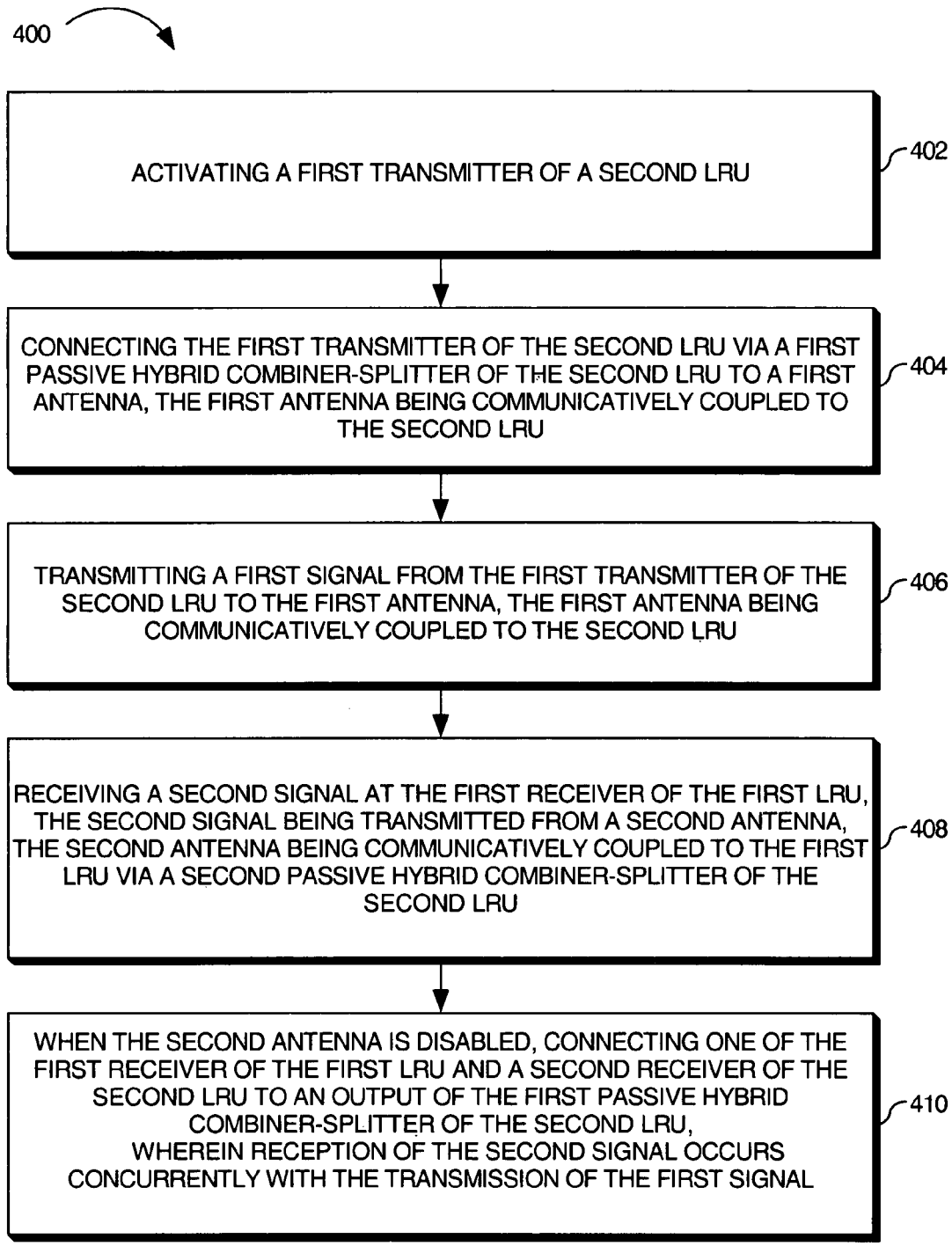
FIG. 4 is a flowchart illustrating a method for providing reduced antenna radio communications in accordance with an exemplary embodiment of the present invention.

FIG. 4 illustrates a method for providing reduced antenna radio communications via the system 100 of the present invention in accordance with an exemplary embodiment of the present invention. The method 400 may include, when a first receiver (116) of a first LRU (104) is operable, activating a first transmitter (106) of a second LRU (102), 402. The method 400 may further include, when the first receiver (116) of the first LRU (104) is operable, connecting the first transmitter (106) of the second LRU (102) via a first passive hybrid combiner-splitter (118) of the second LRU (102) to a first antenna (126), the first antenna (126) being communicatively coupled to the second LRU (102), 404. The method 400 may further include, when the first receiver (116) of the first LRU (104) is operable, transmitting a first signal from the first transmitter (106) of the second LRU (102) to the first antenna (126), the first antenna (126) being communicatively coupled to the second LRU (102), 406. The method 400 may further include, when the first receiver (116) of the first LRU (104) is operable, receiving a second signal at the first receiver (116) of the first LRU (104), the second signal being transmitted from a second antenna (128), the second antenna (128) being communicatively coupled to the first LRU (104) via a second passive hybrid combiner-splitter (122) of the second LRU (102), 408. The method 400 may further include, when the second antenna (128) is disabled, connecting one of the first receiver (116) of the first LRU (104) and a second receiver (114) of the second LRU (102) to an output of the first passive hybrid combiner-splitter (118) of the second LRU (102), 410. In an exemplary embodiment, reception of the second signal occurs concurrently with the transmission of the first signal. In this manner, the system 100 of the present invention may provide concurrent (ex—simultaneous) transmit and receive operation when an antenna (ex—128) fails. During such failure modes, when the simultaneous transmit and receive operation is provided via the first passive hybrid combiner-splitter (118), isolation may be maintained via the inherent isolation of the splitter (118). For instance, with practical hybrid combiner splitter designs, the isolation may be in excess of 40 dB if a low VSWR is presented by the operable antenna, which may be superior to isolation provided by "same-side" antennas of existing 3-antenna systems, should an antenna of such 3-antenna systems fail.

In additional embodiments, the method 400 may further include, when the second antenna (128) is disabled, transmitting at least one of a voice signal and a data signal from the output of the first passive hybrid combiner-splitter (118) of the second LRU (102) to the first receiver (116) of the first LRU (104), 412. The method 400 may further include, when the second antenna (128) is disabled, transmitting at least one of a voice signal and a data signal from the output of the first passive hybrid combiner-splitter (118) of the second LRU (102) to the second receiver (114) of the second LRU (102), 414. In present embodiments, the step of transmitting at least one of a voice signal and a data signal from the output of the first passive hybrid combiner-splitter (118) of the second LRU (102) to the first receiver (116) of the first LRU (104) when the second antenna (128) is disabled, 412 may further include transmitting at least one of the voice signal and the data signal from the first passive hybrid combiner-splitter (118) of the second LRU (102) to a first bypass relay (120) of the second LRU (102), 416. Step 412 may further include directing the at least one of the voice signal and the data signal from the first bypass relay (120) of the second LRU (102) to a second bypass relay (124) of the first LRU (104) via a crosslink connection (132), the crosslink connection (132) communicatively coupling the first LRU (104) and the second LRU (102), 418. Step 412 may further include transmitting the at least one of the voice signal and the data signal from the second bypass relay (124) of the first LRU (104) to the first receiver (116) of the first LRU (104), 420.

In the embodiments described above, it is clear that the system 100 of the present invention is configured for providing concurrent (ex—simultaneous) transmit and receive operation under a variety of circumstances. In exemplary embodiments, the system 100 may provide simultaneous transmit and receive operations not only under normal operating conditions (ex—no failures), but also, when any one of the following occur: failure of one of the first LRU (104) and the second LRU (102) (ex—when electronics or components of one of the first LRU (104) and the second LRU (102) fail; it is assumed that the passive hybrid combiner-splitters (118, 122) of the LRUs (102, 104) are highly reliable since they are passive devices and are well-protected from any antenna lighting effects, and thus, will remain functional even when other components, electronics of their respective LRUs (102, 104) fail, thereby promoting the ability of the system 100 of the present invention to provide concurrent (ex—simultaneous) receive and transmit operations, such as via the crosslink relay (includes the bypass relays 120, 124 and crosslink connection 132), under such circumstances); failure of one of the first antenna (126) and the second antenna (128); failure of the first antenna (126) and the first LRU (104); and failure of the second antenna (128) and the second LRU (102).

It is understood that in the above described method embodiments, terms such as: "first LRU" & "second LRU"; "first antenna" & "second antenna"; and the like may be interchangeably referenced with corresponding reference numerals of FIG. 1. For instance, "first LRU" and "second LRU" may correspond to either 102 or 104, such that the term "first LRU" may correspond to 102, while the term "second LRU" corresponds to 104, or alternatively, the term "first LRU" may correspond to 104, while the term "second LRU" corresponds to 102.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing reduced antenna radio communications, comprising:

when a first receiver of a first Line-Replaceable Unit (LRU) is operable, activating a first transmitter of a second LRU;

when the first receiver of the first LRU is operable, connecting the first transmitter of the second LRU via a first passive hybrid combiner-splitter of the second LRU to a first antenna, the first antenna being communicatively coupled to the second LRU;

when the first receiver of the first LRU is operable, transmitting a first signal from the first transmitter of the second LRU to the first antenna, the first antenna being communicatively coupled to the second LRU;

when the first receiver of the first LRU is operable, receiving a second signal at the first receiver of the first LRU, the second signal being transmitted from a second antenna, the second antenna being communicatively coupled to the first LRU via a second passive hybrid combiner-splitter of the first LRU; and when at least one of the first receiver of the first LRU and electronics of the first LRU is disabled, re-routing the second signal transmitted from the second antenna via the second passive hybrid combiner-splitter, then to a first bypass relay of the first LRU, then to a second bypass relay of the second LRU via a crosslink connection, the crosslink connection communicatively connecting the first LRU with the second LRU, then to a second receiver of the second LRU, wherein reception of the second signal by at least one of the first receiver and the second receiver occurs concurrently with the transmission of the first signal from the first transmitter.

2. A method for providing reduced antenna radio communications as claimed in claim 1, further comprising:
when the first receiver of the first LRU is operable, activating a second transmitter of the second LRU.

3. A method for providing reduced antenna radio communications as claimed in claim 2, further comprising:
when the first receiver of the first LRU is operable, connecting the second transmitter of the second LRU via the first passive hybrid combiner-splitter of the second LRU to the first antenna, the first antenna being communicatively coupled to the second LRU.

4. A method for providing reduced antenna radio communications as claimed in claim 3, further comprising:
when the first receiver of the first LRU is operable, transmitting a third signal from the second transmitter of the second LRU to the first antenna, the first antenna being communicatively coupled to the second LRU.

5. A method for providing reduced antenna radio communications as claimed in claim 4, further comprising:

when the first receiver of the first LRU is disabled, activating a third transmitter of the first LRU.

6. A method for providing reduced antenna radio communications as claimed in claim 5, further comprising:
when the first receiver of the first LRU is disabled, connecting the third transmitter of the first LRU via the second passive hybrid combiner-splitter of the first LRU to the second antenna, the second antenna being communicatively coupled to the first LRU.

7. A method for providing reduced antenna radio communications as claimed in claim 6, further comprising:
when the first receiver of the first LRU is disabled, transmitting the first signal from the third transmitter of the first LRU to the second antenna, the second antenna being communicatively coupled to the first LRU.

8. A method for providing reduced antenna radio communications as claimed in claim 7, further comprising:
when the first receiver of the first LRU is disabled, activating a fourth transmitter of the first LRU.

9. A method for providing reduced antenna radio communications as claimed in claim 8, further comprising:
when the first receiver of the first LRU is disabled, connecting the fourth transmitter of the first LRU via the second passive hybrid combiner-splitter of the first LRU to the second antenna, the second antenna being communicatively coupled to the first LRU.

10. A method for providing reduced antenna radio communications as claimed in claim 9, further comprising:
when the first receiver of the first LRU is disabled, transmitting the third signal from the fourth transmitter of the first LRU to the second antenna, the second antenna being communicatively coupled to the first LRU.

11. A method for providing reduced antenna radio communications as claimed in claim 1, wherein the crosslink connection is a coax cable connection.

* * * * *